United States Patent [19]
Carlick et al.

[11] 3,783,151
[45] Jan. 1, 1974

[54] ISOCYANATE-MODIFIED ESTERS

[75] Inventors: Daniel J. Carlick, Berkeley Heights; Frank Marra, Wayne, both of N.J.; Gerhard E. Sprenger, North Stonington, Conn.

[73] Assignee: Sun Chemical Corporation, New York, N.Y.

[22] Filed: Mar. 23, 1971

[21] Appl. No.: 127,357

Related U.S. Application Data

[63] Continuation-in-part of Ser. No. 850,633, Aug. 15, 1969, abandoned.

[52] U.S. Cl......... 260/471 C, 260/468 E, 260/482 B
[51] Int. Cl............................................. C07c 125/06
[58] Field of Search .................... 260/471 C, 468 E, 260/482 B

[56] References Cited
UNITED STATES PATENTS
3,428,614  2/1969  Brownstein ..................... 260/471 C

*Primary Examiner*—Lorraine A. Weinberger
*Assistant Examiner*—L. Arnold Thaxton
*Attorney*—Cynthia Berlow

[57] ABSTRACT

Isocyanate-modified polyethylenically unsaturated esters in combination with photoinitiators are radiation-curable compositions useful as printing inks, printing plates, coating compositions, adhesives, and the like.

4 Claims, No Drawings

ISOCYANATE-MODIFIED ESTERS

This application is a continuation-in-part of copending application Ser. No. 850,633 (filed Aug. 15, 1969, now abandoned).

This invention relates to carbamates. More specifically it relates to isocyanate-modified esters of an ethylenically unsaturated acid and an alcohol.

The use of radiation-curable ethylenically unsaturated monomeric materials in coating compositions, adhesives, printing inks, and the like is known. It is also known that such monomeric materials are converted into polymers by the action of radiation and that they will polymerize at an improved rate when exposed to actinic radiation in the presence of a photoinitiator.

The use of some of these materials is, however, somewhat limited by their strong affinity for water. When, for example, the compositions are formulated into printing inks for lithography, they absorb large amounts of fountain solutions, resulting in weak printing and poor water-ink control. In some cases, when used as adhesives, the bonding properties are poor; in coatings for paper they lack gloss and smoothness and they cure at a slower rate than when in a dry condition.

The reason for this water-sensitivity is not now fully understood, but it is believed to be due, at least in part, to the presence of hydroxyl groups.

It has now been found that the hydrophilic nature of these compositions can be somewhat lessened by modifying the monomeric material of the composition with an isocyanate. As used hereinafter, unless otherwise specified "monomeric material" means both monomers and prepolymers, that is, dimers, trimers, and other oligomers and mixtures and copolymers thereof. The resulting isocyanate-modified material has decreased water-sensitivity without loss in radiation-susceptibility or adverse effect on its other properties, e.g., gloss, printability, smoothness, adhesion, and so forth.

Inks and coatings made from these compositions are solvent-free, hydrophobic, and dry almost instantaneously in air at ambient temperature when exposed to a source of radiation, thus eliminating the need for ovens as well as avoiding the air pollution, fire hazards, odor, and so forth that accompany the use of volatile solvents. The inks have excellent workability on offset printing presses. They form extremely hard and durable films on a wide variety of substrates, such as, for example, newsprint; coated paper stock, irregular, e.g., corrugated, board; metal, e.g., foils, meshes, cans, and bottle caps; woods; rubbers; polyesters, such as polyethylene terephthalate; glass; polyolefins, such as treated and untreated polyethylene and polypropylene; cellulose acetate; fabrics such as cotton, silk, and rayon; and the like. They exhibit no color change in the applied film when subjected to the required curing conditions, and they are resistant to flaking; smudging; salt spray; scuffing; rubbing; and the deteriorating effects of such substances as alcohols, oils, and fats. The adhesives made with these compositions have particularly good bonding properties. In addition, the compositions withstand both heat and cold, making them useful, for example, in printing inks or coating for containers that must be sterilized, e.g., up to about 150°C. under pressure, and/or refrigerated, e.g., at less than about −20°C.; and so forth.

In general the compositions comprise (a) at least one radiation-curable isocyanate-modified polyethylenically unsaturated compound and (b) at least one photoinitiator, along with, if desired, (c) at least one colorant. It is also possible, and often desirable, to have compositions comprising (a) at least one isocyanate-modified polyethylenically unsaturated material, (b) at least one polyethylenically unsaturated material with free hydroxyl groups which may be the same as the starting material of (a) or different, and (c) at least one photoinitiator with or without (d) at least one colorant.

The compounds usable as starting materials in the present invention are polyfunctional ethylenically unsaturated monomers and prepolymers and mixtures and copolymers thereof. The term "polyethylenically unsaturated" as employed herein refers to compounds having two or more terminal or pendant ethylenic groups. The monomers or prepolymers may be generally described as the acrylic acid, methacrylic acid, itaconic acid, and the like, esters of aliphatic polyhydric alcohols such as, for example, the di- and polyacrylates, the di- and polymethacrylates, and the di- and polyitaconates of ethylene glycol, triethylene glycol, tetraethylene glycol, tetramethylene glycol, trimethylolethane, trimethylolpropane, pentaerythritol, dipentaerythritol, tripentaerythritol, other polypentaerythritols, and the like, or mixtures with each other or with their partially esterified analogs, and their prepolymers, said compound or mixture having free hydroxyl content. Typical compounds include, but are not limited to, trimethylolpropane triacrylate, trimethylolethane triacrylate, trimethylolpropane trimethacrylate, trimethylolethane trimethacrylate, tetramethylene glycol dimethacrylate, ethylene glycol diacrylate, ethylene glycol dimethacrylate, triethylene glycol dimethacrylate, tetraethylene glycol diacrylate, tetraethylene glycol dimethacrylate, pentaerythritol diacrylate, pentaerythritol triacrylate, pentaerythritol tetracrylate, dipentaerythritol diacrylate, dipentaerythritol triacrylate, dipentaerythritol tetraacrylate, dipentaerythritol pentaacrylate, dipentaerythritol hexacrylate, tripentaerythritol octoacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, and the like, and the mixtures and prepolymers thereof, mixtures of dimers and trimers of tripentaerythritol octoacrylate, mixtures of dimers and trimers and dipentaerythritol hexacrylate, and the like; and mixtures of these with their partially esterified analogs wherein some hydroxyl content must exist.

The above-described esters may be obtained in any convenient manner, for example, by the ester interchange method of interacting a lower alkyl ester of the acid with the alcohol in the presence of a suitable catalyst or by the reaction of the alcohol with, for example, acrylic or methyacrylic acid or with an acrylyl or a methacrylyl halide.

The monomer, prepolymer, or mixture thereof is reacted with an isocyanate to yield a material that has increased hydrophobic properties and thus improved water-resistance, gloss, bonding qualities, smoothness, and so forth, as well as increased curing speed. The isocyanate-modified ester is conveniently prepared by reacting the monomeric material with the isocyanate.

Although in general it has been found that the temperature is not critical, the reaction is usually carried out within the range of about 25° to 100°C., and preferably at about 50°C.

While it is possible to convert all of the hydroxyl groups of the starting ester to carbamate groups, for the applications for which the products are most appropriate, i.e., inks, printing plates, coatings, adhesives, and the like, it is desirable not to convert all of the hydroxyl groups, that is, to leave in the composition some ester having free hydroxyl content, since the use of excessive amounts of isocyanate in the reaction results in products having decreased storage stability. The amount of isocyanate that must be reacted with the ester to obtain a product with optimum properties will vary with the specific monomeric material and the type of isocyanate employed and with the properties that are desired. For example, for use in lithography, in a compound prepared from phenyl isocyanate the conversion is preferably not in excess of about 60 per cent of the hydroxyl content.

In addition, the ratio of —NCO groups to —OH groups is important; this also varies with the specific monomer and isocyanate selected. When, for example, the ester is a pentaerythritol-3.5-acrylate, that is, a mixture of approximately 50 per cent of the triacrylate and 50 per cent of the tetraacrylate, the ratio of —NCO groups to —OH groups is generally within the range of about 0.2 to 0.8, and preferably the ratio is about 0.6.

Any of a wide variety of suitable organic isocyanates may be employed, including aliphatic, cycloaliphatic, heterocyclic, and aromatic mono- and polyisocyanates, and combinations of these. Examples include, but are not limited to, 6-ethyldecyl isocyanate, octadecyl isocyanate, phenyl isocyanate, chlorophenyl isocyanate, stearyl isocyanate, cyclohexyl isocyanate, 6-phenyldecyl isocyanate, 6-cyclohexyldodecyl isocyanate, 2,4-tolylene diisocyanate, 2,6-tolylene diisocyanate, 1,4-phenylene diisocyanate, hexamethylene diisocyanate, 1,4-naphthalene diisocyanate, 1,5-naphthalene diisocyanate, 4,4'-diphenylmethane diisocyanate, p,p'-diphenyl diisocyanate, butylene-1, 4-diisocyanate, ethylene diisocyanate, trimethylene diisocyanate, tetramethylene-1,4-diisocyanate, butylene-2,3-diisocyanate, cyclohexylene-1,2-diisocyanate, methylene-bis (4-phenylisocyanate), diphenyl-3,3'-dimethyl-4,4'-diisocyanate, xylylene diisocyanate, cyclohexane-1,4-diisocyanate, 1-methoxyphenyl-2,4-diisocyanate, benzene-1,2,4-triisocyanate, polymethylene polyphenylisocyanate, toluene-2,4,6-triisocyanate, 4,4'-dimethyldiphenyl methane-2,2',5,5'-tetraisocyanate, and the like, and mixtures thereof.

The isocyanate reacts with the ethylenically unsaturated hydroxyl material to give the carbamate reaction product, thus reducing the free hydroxyl content of the starting compound and so reducing its water sensitivity. This increase in the hydrophobicity has made the products more suitable for use in lithography, adhesives, coating compositions, etc., without loss in stability and with increased speed of curing.

The photoinitiator may be an acyloin; an acyloin derivative; a halogenated aliphatic, aromatic, or alicyclic hydrocarbon, or a mixture thereof, in which the halogen atoms are attached directly to the ring structure in the aromatic and alicyclic compounds, that is, the halogen is bonded directly to the hydrocarbon nucleus, and to the carbon chain in the aliphatic compounds, the halogen being chlorine, bromine, or iodine. Suitable photoinitiators incude, for example, benzoin methyl ether; benzoin ethyl ether; didesyl ether; desyl bromide; desyl chloride; desyl amine; polychlorinated polyphenyl resins, such as the Aroclors (Monsanto Chemical Co.) which in general are polychlorinated diphenyls, polychlorinated triphenyls, and mixtures of the two; chlorinated rubbers, such as the Parlons (Hercules Powder Co.); copolymers of vinyl chloride and vinyl isobutyl ether, such as Vinoflex MP-400 (BASF Colors and Chemicals Inc.); chlorinated aliphatic waxes, such as Chlorowax 70 (Diamond Alkali Co.); perchloropentacyclodecane, such as Dechlorane+ (Hooker Chemical Co.); chlorinated paraffins, such as Chlorafin 40 (Hooker Chemical Co.) and Unichlor-70B (Neville Chemical Co.); mono- and polychlorobenzenes; mono- and polybromobenzenes; mono- and polychloroxylenes; mono- and polybromoxylenes; dichloromaleic anhydride; halogenated polyolefins, such as chlorinated polyethylene; 2,4-dimethylbenzene sulfonyl chloride; 1-bromo-3-(m-phenoxyphenoxy benzene); 2-bromoethylmethyl ether; chlorendic anhydride; and so forth; and mixtures of these.

The radiation-curable composition may include, if desired, about 0.1 to 2.0 per cent, based on the weight of the total composition, of an accelerating agent, such as the mercaptans and their derivatives, for example, ethyl mer-captoacetate; amine oxides, such as bis(2-hydroxyethyl)cocoamine oxide and bis(2-hydroxyethyl)octadecylamine oxide; cyclized unsaturated aromatic hydrocarbons, e.g., neohexene, cyclohexene, cyclooctene, and d-limonene; and the like; and mixtures thereof. The above described additives may further be used in varying mixtures. The radiation-curable esters may be modified, if desired, by the addition of a prepolymer, such as a diallyl phthalate prepolymer, and a chain transfer agent; a prepolymer and an unsaturated compound reactive with oxygen, e.g., an alkyd resin; a prepolymer and a further modifying substance, e.g., cetyl vinyl ether; a viscosity control agent together with a chain transfer agent, a prepolymer or other modifying resin; and mixtures thereof.

The ratio of the amount of the isocyanate-modified monomeric material to the photoinitiator in the composition may range from about 98:2 to about 15:85, and preferably from about 70:30 to about 30:70.

Conventional colorants may be used in conventional quantities in ink formulations based on these compositions. Suitable pigments include carbon black, zinc oxide, titanium dioxide, phthalocyanine blue, phthalocyanine green, benzidine yellow, naphthol yellow lake, cadmium orange, cadmium yellow, chrome yellow, Prussian blue, bronze blue, chrome green, peacock blue lake, milori blue, ultramarine blue, red lake C, para red toluidine red, sodium lithol red, barium lithol red, lithol rubine, molybdated scarlet chrome, ferric oxide, aluminum hydrate, and the like. The vehicle may be used in an amount ranging from about 20 to 99.9 per cent of the weight of the total composition, and the amount of colorant may range from about 0.1 to 80 per cent of the weight of the total composition.

Other commonly known modifiers may be incorporated into the formulations using these compositions, including plasticizers; wetting agents for the colorant, such as dichloromethylstearate and other chlorinated fatty esters; leveling agents, such as lanolin, paraffin waxes, and natural waxes; and the like. Such modifiers are generally used in amounts ranging up to about 3 per cent by weight, preferably about 1 per cent, based on the total weight of the formulation.

The formulations may be prepared in any convenient manner, such as for example in a three-roll mill, a ball mill, a colloid mill, or the like, in accordance with known dispersion techniques.

Variables which determine the rate at which a radiation-curable composition will dry include the nature of the substrate, the specific ingredients in the composition, the concentration of the photoinitiator, the thickness of the material, the nature and intensity of the radiation source and its distance from the material, the presence or absence of oxygen, and the temperature of the surrounding atmosphere. Irradiation of the compositions may be accomplished by any one or a combination of a variety of methods. The composition may be exposed, for example, to actinic light from any source and of any type as long as it furnishes an effective amount of ultraviolet radiation, since the compositions activatable by actinic light generally exhibit their maximum sensitivity in the range of about 1800 A. to 4000 A., and preferably about 2000 A. to 3000 A.; electron beams; gamma radiation emitters; and the like; and combinations of these. Suitable sources include, but are not limited to, carbon arcs, mercury-vapor arcs, fluorescent lamps with special ultraviolet light-emitting phosphors, argon glow lamps, photographic flood lamps, Van der Graaff accelerators, and so forth.

The time of irradiation must be sufficient to give the effective dosage. Irradiation may be carried out at any convenient temperature, and most suitably is carried out at room temperature for practical reasons. Distances of the radiation source from the work may range from about 1/8 to 10 inches, and preferably about ⅛ to 3 inches.

The compositions are suitable as adhesives; as coatings for metals, plastics, textiles, paper, cardboard, glass, boxboard, and the like; as markers for roads, parking lots, airfields, and similar surfaces; as vehicles for printing plates; and the like.

When the compositions are used as adhesives, at least one of the substrates must be translucent when ultraviolet light is used. When the radiation source is an electron beam or gamma radiation, at least one of the substrates must be capable of transmitting high energy electrons or gamma radiation, respectively, and neither is necessarily translucent to light. Typical laminations include polymer-coated cellophane to polymer-coated cellophane films, polymer-coated cellophane to polypropylene, Mylar to a metal substrate such as copper, opaque oriented polypropylene to aluminum, and the like.

The compositions may be utilized for metal coatings, particularly for metals which are subsequently to be printed. Glass and plastics may also be coated, and the coatings are conventionally applied by roller or spray. Pigmented coating systems may be used for various polyester and vinyl films; glass; polymer-coated cellophane; treated and untreated polyethylene, for example in the form of disposable cups or bottles; and the like.

The compositions are also suitable for the treatment of textiles, both natural and synthetic, e.g., in vehicles for textile printing inks or for specialized treatments of fabrics to produce water repellency, oil and stain resistance, crease resistance, etc.

Radiation-curable elements comprise a support, e.g., a sheet or plate, having superimposed thereon a layer of the above-described compositions. Suitable supports include metals, e.g., steel and aluminum plates, sheets, or foils; and films or plates of various film-forming synthetic resins or high polymers, such as addition polymers, and in particular vinyl polymers, e.g., vinyl chloride polymers, vinylidene chloride polymers, vinylidene chloride copolymers with vinyl chloride, with vinyl acetate, or with acrylonitrile, and vinyl chloride copolymers with vinyl acetate or acrylonitrile; linear condensation polymers such as polyesters, e.g., polyethylene terephthalate; polyamides; etc. Fillers or reinforcing agents may be present in the synthetic resin or polymer bases. In addition highly reflective bases may be treated to absorb ultraviolet light, or a light absorbtive layer may be transposed between the base and radiation-curable layer.

Presensitized printing plates can be made by exposing to radiation selected portions of the radiation-curable layer thereof until polymerization is completed to the desired depth in the exposed portions. The unexposed portions of the layer are then removed, e.g., by the use of solvents which dissolve the monomer or prepolymer but not the polymer.

The compositions as described herein possess many advantages over the conventional oleoresinous and solvent-type inks and coatings. The substrate need not be pretreated or prepared in any way. The use of volatile solvents and the attendant hazards and odor are eliminated. The inks and coating have excellent adhesion to the substrate after exposure to radiation. They have good gloss and rub-resistance and withstand temperatures as high as about 150°C. and as low as about −20°C. The printed or coated sheets can be worked and turned immediately after exposure to the energy source.

In order to determine the lithographic efficiency of the composition, the inks were subjected to litho break tests which involved running them on a Thwing-Albert litho break tester together with fountain solution and evaluating the resultant product by conventional techniques. The amount of water take-up was also determined by weighing the ink remaining on the rollers after the break test, both before and after being dried in an oven. In addition, the inks were run on a press to evaluate their actual lithographic efficiency.

While there are disclosed below but a limited number of embodiments of the invention herein presented, it is possible to produce still other embodiments without departing from the inventive concept herein disclosed. It is desired, therefore, that only such limitations be imposed on the appended claims as are stated therein. Unless otherwise specified, all parts are given by weight.

EXAMPLE 1

A. in a 5-liter three-necked flask connected with a stirrer, a thermometer, and a condenser were placed 1420 ml. of dried benzene, 409 grams (3 moles) of pentaerythritol, 3 grams of cuprous oxide (as polymerization inhibitor), 46 grams of concentrated sulfuric acid (as catalyst), and 1296 grams (18 moles) of glacial acrylic acid with 1 per cent of p-methoxyphenol (as inhibitor).

The mixture was heated at about 88°C. until 62.3 grams (3.46 moles) of water of esterification per mole of pentaerythritol was removed.

After cooling, the mixture was washed with 700 ml. of 20 per cent NaCl solution, twice with 350 ml. of 24 per cent KHCO$_3$ solution, and finally with 350 ml. of 20 per cent NaCl solution. The benzene solution was filtered, 0.8 gram of p-methoxyphenol added, and the remaining solvent removed in vacuum using copper wire as an inhibitor.

The yield was 316 grams per mole of the pentaerythritol employed of a pale yellow liquid which, upon standing, solidified to a semi-solid melting at 48°-49°C. and having a viscosity of 875 Cps. Analysis showed 1.5 per cent volatiles and an equivalent weight of 95.0 based on the saponification value.

The product was accordingly assigned the empirical formula $(HOH_2C)_{0.54}-C-(CH_2OOC-CH:CH_2)_{3.46}$ indicating that it was a mixture of pentaerythritol triacrylate and pentaerythritol tetraacrylate in the ratio of 0.54:0.46 mole, having a hydroxyl equivalent of 607.

B. 607 Grams of the product of part (A) was placed in a dry three-necked flask equipped with an agitator, a thermometer, a dropping funnel, and a gas inlet and outlet tube. At room temperature while agitating the charge and passing a small stream of dry air through the flask above the surface of the liquid, 72.6 grams (0.61 mole) of phenyl isocyanate was added slowly through the dropping funnel. After completion of the addition (about 1 hour), the reaction mass was allowed to stand for three hours and then discharged.

The product was a viscous, slightly yellow liquid having a viscosity of 2680 Cps., as measured with a Brookfield Viscosimeter (No. 4 spindle at 60 rpm). Infrared analysis indicated the absence of the isocyanate peak and hence complete reaction. The product was a mixture of unmodified pentaerythritol triacrylate, unmodified pentaerythritol tetraacrylate, and pentaerythritol triacrylate-monophenyl carbamate.

C. An ink was prepared by grinding the following ingredients on a three-roll mill:

|  | Per Cent |
|---|---|
| 70/30 mixture of the product of part (B)/Aroclor 4465* | 85 |
| benzidine yellow | 15 |

* Monsanto Chemical Co.'s mixture of bi- and triphenyls containing 65 per cent by weight of chlorine.

The ink was run on a Miehle press to print coated paper. The printed paper was exposed at a distance of 1 ¾ inches from three 21-inch 2100 watt Hanovia ultraviolet lamps. The ink dried in 0.8 second and had excellent gloss and water-resistance.

EXAMPLE 2

A. 607 Parts of pentaerythritol-3.46-acrylate, prepared by the process of part (A) of Example 1 and having a refractive index of $n_D^{25°}=1.4850$, was charged into a dry three-necked flask equipped with an agitator, a thermometer, a dropping funnel, and gas inlet and outlet tube. While agitating at room temperature and passing a small stream of dry air through the flask above the surface of the liquid, 26 parts of tolylene-2,4-diisocyanate (0.15 mole) was slowly over a period of 30 minutes introduced through the dropping funnel. After the completion of the addition, the reaction mass was allowed to stand for several hours and then discharged.

The product was a viscous, slightly yellow liquid having a viscosity of 2460 Cps, as measured at 25°C. with a Brookfield Viscosimeter (No. 4 spindle at 60 rpm). Infrared analysis indicated the absence of the isocyanate peak and hence complete reaction after 20-hours reaction time. The material was a physical mixture of unchanged pentaerythritol triacrylate, unreacted pentaerythritol tetraacrylate, and the reaction product of pentaerythritol triacrylate with tolylene-2,4 diisocyanate, that is, the compound of the formula

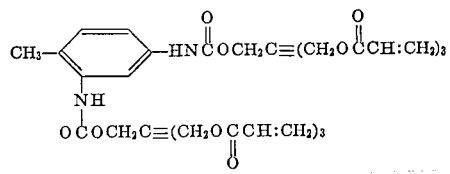

B. The procedure of part (C) of Example 1 was repeated using a 70/30 mixture of the product of part (A) and Aroclor 4465. The results were comparable.

EXAMPLE 3

The procedures of parts (A) and (B) of Example 2 were repeated using as the isocyanate an 80:20 mixture of tolylene-2,4-diisocyanate and tolylene-2,6-diisocyanate instead of pure tolylene-2,4-diisocyanate. The product was similar except for the added presence of the reaction product of pentaerythritol triacrylate with the tolylene-2,6-diisocyanate isomer. The resulting ink was comparable to that of part (C) of Example 1.

EXAMPLE 4

A. 456 Parts of dry benzene and 261 parts of tolylene-2,4-diisocyanate were charged into a dry three-necked flask. While cooling and maintaining the temperature at 25°-30°C., there was added over a period of 15 minutes 195 parts of dry 2-ethyl hexanol containing 1 part of dibutyl tin acetate. The liquid reaction mass was stirred at room temperature for several hours and then allowed to stand overnight.

The reaction mass, an almost colorless non-viscous liquid, was freed from the benzene solvent under vacuum, first at 125 Torr. and up to 70°C. and then at 20° Torr. and 80°C. The vacuum was released with nitrogen, and the reaction mass discharged. The yield was 459 parts of liquid 4,N,2-isocyanato-toluyl-β-ethyl hexyl carbamate having the formula

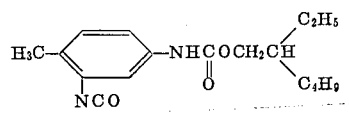

B. 607 Parts of pentaerythritol-3.46-acrylate, prepared by the process of part (A) of Example 1, and 0.5 part of dibutyl tin acetate were charged into a dry three-necked flask equipped with an agitator, a thermometer, a dropping funnel, and a gas inlet and outlet tube. While agitating at 45°C. and passing a small stream of dry air through the flask above the surface of the liquid, 98.8 parts of 4,N,2-isocyanato-toluyl-β-ethyl hexyl carbamate prepared as in part (A) was charged at once through the dropping funnel. The liquid reaction mass was stirred at 45°C. for several hours, allowed to stand overnight, and then discharged.

The reaction product was a viscous, slightly yellow liquid having a viscosity of 4560 Cps, as measured at 25°C. with a Brookfield Viscosimeter (No. 4 spindle at 60 rpm.). Infrared analysis of the product indicated the absence of the isocyanate absorption peak and, therefore, complete reaction at 20-hours reaction time. The material was a physical mixture of unchanged pentaerythritol triacrylate, unreacted pentaerythritol tetraacrylate, and the reaction product of pentaerythritol triacrylate with 4,N,2-isocyanate-toluyl-β-ethyl hexyl carbamate, that is, the compound having the formula

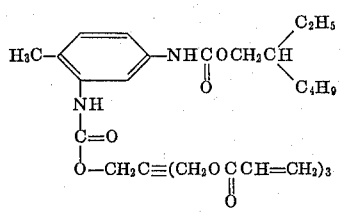

C. The product of part (B) was formulated into an ink and run as in part (C) of Example 1. The results were comparable.

EXAMPLE 5

The procedures of parts (B) and (C) of Example 4 were repeated except that the carbamate was a 80/20 mixture of 4,N,2-isocyanato-toluyl-β-ethyl hexyl carbamate and 6,N,2-isocyanato-toluyl-β-ethyl hexyl carbamate. The results were comparable, except for the added presence of the reaction product of pentaerythritol triacrylate with the 6,N,2-isocyanato-toluyl-β-ethyl hexyl carbamate isomer.

EXAMPLE 6

A composition consisting of 70 parts of the product of part (B) of Example 1, 30 parts of Aroclor 4465, and 0.1 part of dimethyl polysiloxane (to promote wetting) was applied in thicknesses ranging from 0.25 to 3.0 pounds per ream to each of the following substrates: book cover stock, clay-coated board, offset stock, can labels, and polyethylene board. The printed substrates were cured by exposure at the rate of 50 feet per minute at a distance of 1 inch from a 1200-watt Hanovia ultraviolet energy source.

The resulting products were superior in gloss properties, adhesion, and abrasion resistance to comparable products prepared in the same manner except with unmodified pentaerythritol triacrylate.

EXAMPLE 7

The composition of Example 6 was applied by a letterpress method at film weights ranging from 0.5 to 3.0 pounds per ream to each of the following substrates: Saran-coated cellophane, polyethylene surface-treated with corona discharge, polyvinylidene dichloride-coated polypropylene, and Mylar. Laminations were made at 150°F. and 50 pounds/inch pressure between cellophane and cellophane, cellophane and polypropylene, and polypropylene and Mylar and then cured by exposing them at the rate of 50 feet per minute at a distance of 1 inch from a 1200-watt Hanovia ultraviolet lamp. The laminations were successful as evidenced by tear seals having bond strengths of at least 300 grams per inch.

EXAMPLE 8

A. A composition consisting of 70 parts of the product of part (B) of Example 1 and 30 parts of Aroclor 4465 cured to a tack-free dry film in 0.7–0.8 second when exposed at a distance of 1 ¾ inches to actinic radiation from a 2100-watt Hanovia ultraviolet lamp.

B. Under the same conditions, a composition consisting of 70 parts of unmodified pentaerythritol triacrylate and 30 parts of Aroclor 4465 cured to a tack-free film in 1.0 to 1.2 seconds.

EXAMPLE 9

The procedure of part (C) of Example 1 was repeated using each of the following initiators instead of Aroclor 4465: Aroclor 1240 (Monsanto Chemical Co.'s biphenyl containing 40 percent by weight of chlorine), Aroclor 5460 (Monsanto Chemical Co.'s triphenyl containing 60 percent by weight of chlorine), desyl bromide, didesyl ether, desyl amine, benzoin methyl ether, benzoin ethyl ether, triethyl amine, triethanol amine, Parlon S-5 (Hercules Powder Co.'s chlorinated rubber), Chlorowax 70 (Diamond Alkali Co.'s chlorinated aliphatic wax), and chlorendic anhydride. The results were comparable.

EXAMPLE 10

The procedure of part (B) of Example 1 was repeated except that each of the following monomeric materials was used instead of pentaerythritol-3.46-acrylate: ethylene glycol diacrylate, ethylene glycol dimethacrylate, trimethylolpropane triacrylate, trimethylolethene triacrylate, trimethylolpropane trimethacrylate; pentaerythritol trimethacrylate, pentaerythritol diitaconate, and a mixture of dimers and trimers of pentaerythritol triacrylate. The results were comparable.

EXAMPLE 11

A. The procedure of part (B) of Example 1 was repeated with pentaerythritol acrylates having ester ranks other than 3.46. The viscosities of the resulting carbamates are tabulated below.

B. The products of part (A) were cured by exposing them on glass substrates at a distance of 1¾ inches from a 2100-watt Hanovia ultraviolet lamp. The cure speeds are tabulated below.

TABLE I

| Ester Rank Of Pentaerythritol | Viscosity, CPS | Cure Time, Seconds |
|---|---|---|
| 3.82 | 1030 | gelled in one day |
| 3.75 | 1400 | 0.9 |
| 3.55 | 3440 | 0.9 |
| 3.37 | 5440 | 0.9 |
| 3.21 | 7900 | 0.8 |
| 3.01 | 20,000 | 0.6 |
| 2.68 | > 10$^5$ | tacky |

EXAMPLE 12

A. The procedures of part (B) of Example 1 and Example 10 were repeated except that each of the isocyanates listed in Table II was used instead of phenyl isocyanate.

B. The products of part (A) were cured by exposing them on glass substrates at a distance of 1 ¾ inches from a 2100-watt Hanovia ultraviolet lamp. The viscosities and cure speeds of the carbamates of pentaerythritol-3.46-acrylate are tabulated below.

TABLE II

| Isocyanate (NCO/OH Ratio) | | Viscosity, CPS | Cure Time, Seconds |
|---|---|---|---|
| toluene di isocyanate | (0.2) | 2000 | 1.1 |
| toluene di isocyanate | (0.4) | 4610 | 0.7 |
| toluene di isocyanate | (0.6) | 12600 | 0.5 |
| o-tolyl isocyanate | (0.6) | 3580 | 0.7 |
| p-chlorophenyl isocyanate | (0.6) | 5730 | 0.8 |
| cyclohexyl isocyanate | (0.6)* | 3100 | 0.8 |
| allyl isocyanate | (0.6) | 1300 | 0.97 |
| n-butyl isocyanate | (0.6)* | 1430 | — |
| methyl isocyanate | (0.56)* | 1700 | 0.6 |

* plus 0.2% stannous octoate as catalyst

EXAMPLE 13

The procedure of part (C) of Example 1 was repeated with each of the following colorants instead of benzidine yellow: lithol rubine red, phthalocyanine blue, carbon black, milori blue, and phthalocyanine green. The results were comparable.

EXAMPLE 14

The procedures of Examples 1-13 were repeated except that instead of being exposed to ultraviolet light the samples were passed on a conveyor belt beneath the beam of a Dynacote 300,000-volt linear electron accelerator at a speed and beam current so regulated as to produce a dose rate of 0.5 megarad.

These systems produced resinous materials of varying degrees of hardness in films from 0.5 to 20 mils thick having tacky surfaces.

EXAMPLE 16

The procedures of Examples 1-13 were repeated except that instead of being exposed to ultraviolet light the samples were exposed to a combination of ultraviolet light and electron beam radiation in a variety of arrangements: ultraviolet light, then electron beam; electron beam, then ultraviolet light; ultraviolet light before and after electron beam; electron beam before and after ultraviolet radiation; and simultaneous electron beam and ultraviolet light radiation. The results were comparable.

What is claimed is:

1.

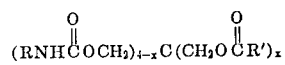

where $x$ is a number in the range of 2.6 to 3.85; R is a phenyl, chlorophenyl, tolyl, cyclohexyl, allyl, butyl, or methyl group; and R' is a residue of acrylic, methacrylic, or itaconic acid.

2.

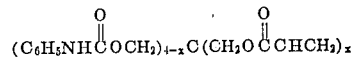

where $x$ is a number in the range of 2.6 to 3.85.

3.

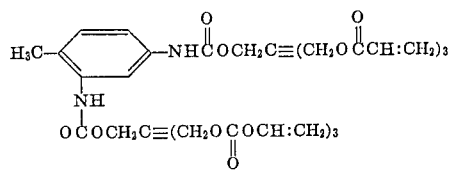

4.

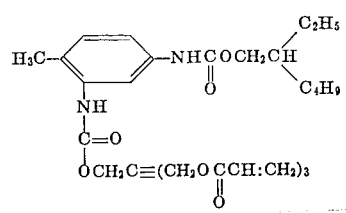

* * * * *

UNITED STATES PATENT OFFICE
CERTIFICATE OF CORRECTION

Patent No. 3,783,151  Dated January 1, 1974

Inventor(s) Daniel J. Carlick, F. Marra, and G.E. Sprenger

It is certified that error appears in the above-identified patent and that said Letters Patent are hereby corrected as shown below:

Claim 3, line 3 of the formula, delete "O" before "CH:"

Signed and sealed this 4th day of June 1974.

(SEAL)
Attest:

EDWARD M. FLETCHER, JR.
Attesting Officer

C. MARSHALL DANN
Commissioner of Patents